(12) United States Patent
Ichioka et al.

(10) Patent No.: US 7,322,900 B2
(45) Date of Patent: Jan. 29, 2008

(54) OIL FEEDING DEVICE

(75) Inventors: Eiji Ichioka, Susono (JP); Hideto Watanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 469 days.

(21) Appl. No.: 11/476,233

(22) Filed: Oct. 4, 2004

(65) Prior Publication Data

US 2006/0231338 A1    Oct. 19, 2006

(30) Foreign Application Priority Data

Oct. 16, 2003    (JP)    ............... 2003-356811

(51) Int. Cl.
  *F16H 57/04*    (2006.01)
  *F16H 3/72*    (2006.01)
(52) U.S. Cl. .................. 475/159; 475/5; 74/467; 184/6.12
(58) Field of Classification Search .............. 475/5, 475/159; 74/467; 184/6.12, 11.1, 11.2, 13.1
  See application file for complete search history.

(56) References Cited

U.S. PATENT DOCUMENTS

| | | | |
|---|---|---|---|
| 1,220,810 A * | 3/1917 | Alquist | 184/6.12 |
| 3,529,698 A * | 9/1970 | Nelson | 184/6.12 |
| 3,545,568 A | 12/1970 | Lacoste | |
| 4,429,587 A | 2/1984 | Finn, III et al. | |
| 4,630,711 A * | 12/1986 | Levrai et al. | 184/6.12 |
| 4,879,921 A * | 11/1989 | Asada et al. | 74/467 |
| 4,987,974 A * | 1/1991 | Crouch | 184/6.12 |
| 6,223,616 B1 | 5/2001 | Sheridan | |

(Continued)

FOREIGN PATENT DOCUMENTS

DE        754 130        8/1951

(Continued)

OTHER PUBLICATIONS

U.S. Appl. No. 10/500,852, filed Jul. 16, 2004, Shimizu, et al.

(Continued)

*Primary Examiner*—Roger Pang
(74) *Attorney, Agent, or Firm*—Oblon, Spivak, McClelland, Maier & Neustadt, P.C.

(57) ABSTRACT

An oil feeding device which has an oil reserving portion 50 and first oil requiring portions 8, 62, 63, 67, 68, 72 and 76 provided in a moving object, and a first oil discharging portion 58 for feeding an oil reserved in the oil reserving portion 50 to the first oil requiring portions comprises: a regulating member 64 for regulating a relative movement of the oil discharged from the first oil discharging portion 58 and the first oil requiring portions in a moving direction of the moving object; a second oil discharging portion 57 for feeding the oil reserved in the oil reserving portion 50 to the first oil requiring portions. A discharging pressures of the oil at the first oil discharging portion 57 and the second oil discharging portion 58 are changed in accordance with the amount of the oil in the oil reserving portion 50. Therefore, the reduction of the amount of oil to be fed to the first oil requiring portions can be suppressed even when the speed of the moving object changes.

13 Claims, 4 Drawing Sheets

U.S. PATENT DOCUMENTS

| | | | |
|---|---|---|---|
| 6,579,202 B2 * | 6/2003 | El-Antably et al. | 475/159 |
| 6,991,574 B2 * | 1/2006 | Martin, III | 475/159 |
| 2002/0094898 A1 | 7/2002 | Hata et al. | |

FOREIGN PATENT DOCUMENTS

| | | |
|---|---|---|
| DE | 38 19 519 A1 | 12/1989 |
| GB | 1188863 | 4/1970 |
| JP | 60-189663 | 12/1985 |
| JP | 61-91661 | 6/1986 |
| JP | 63-166608 | 10/1988 |
| JP | 3-121260 | 12/1991 |
| JP | 5-27413 | 4/1993 |
| JP | 6-82459 | 11/1994 |
| JP | 9-226394 | 9/1997 |
| JP | 2001-227625 | 8/2001 |
| JP | 2003-214532 | 7/2003 |

OTHER PUBLICATIONS

U.S. Appl. No. 10/956,135, filed Oct. 4, 2004, Ichioka, et al.

* cited by examiner

OIL FEEDING DEVICE

BACKGROUND OF THE INVENTION

1. Field of the Invention

This invention relates to an oil feeding device for feeding oil to an oil requiring portion.

The disclosure of Japanese Patent Application No. 2003-356811 filed on Oct. 16, 2003 including specification, drawings and claims is incorporated herein by reference in its entirety.

2. Description of Related Art

In a power transmission system mounted on a moving object, heat is generated on rotary elements forming a part of the power transmission system, and those rotary elements are worn away. In the prior art, therefore, oil is fed to cool and lubricate where the heat is generated or where to be worn. There are known two kinds of method for feeding oil to the heating portion or wearing portion of the power transmission system. The first oil feeding method is a so-called scraping method, in which oil is fed to the oil requiring portion by scraping up the oil in an oil reservoir by the rotary elements constituting a part of the power transmission system. The second oil feeding method is a so-called compulsory lubricating method, in which oil is fed to the oil requiring portion by suctioning the oil in the oil reservoir by an oil pump.

As compared to the second oil feeding method, the first oil feeding method has the advantage to realize weight and cost savings because oil pump is not required therefor. One example of the first oil feeding method is disclosed in Japanese Utility Model Laid-Open No. 63-166608. In this Japanese Utility Model Laid-Open No. 63-166608, there is disclosed a lubricating device for an engine to be employed in a so-called moving object such as a motorcycle, a three-wheeled vehicle and so on. Specifically, there are provided a crankshaft, and a drive shaft and a power taking-off shaft of a transmission in a crankcase, and a clutch is installed on one of the end portions of the drive shaft. Also, a plurality of speed change driving gears is provided on the drive shaft. On the other hand, a plurality of speed change driven gears is provided on the power taking-off shaft, and a plurality of the speed change driving gears and a plurality of the speed change driven gears are meshed with each other.

Moreover, an oil passage is formed on an inner wall of the crankcase, which is communicated with an oil chamber. The oil chamber is arranged in an upper space of the crankcase, and an oil dropping hole is provided in the oil chamber. This oil dropping hole is arranged directly above the portion where a plurality of speed change driving gears and a plurality of speed change driven gears are meshed with each other. According to the above-mentioned construction, the oil collecting on a bottom portion of the crankcase is scraped up by a rotation of the clutch, and the scraped oil is fed to the oil chamber through the oil passage. The oil fed to the oil chamber drops out of the oil dropping hole to lubricate and cool the portion where a plurality of speed change driving gears and a plurality of speed change driven gears are meshed with each other.

According to the lubricating device for the engine disclosed in the aforementioned Japanese Utility Model Laid-Open No. 63-166608, however, when the moving object is accelerated or decelerated, a force acts relatively on the oil dropping from the oil dropping hole of the oil camber in an accelerating or decelerating direction of the moving object. As a result of this, the oil drops on the portion out of the meshing portion of the gears, so that an amount of the oil fed to the meshing portion of the gears decreases. Therefore, the oil runs short at the meshing portion of the gears, and this may degrade a lubricating performance and a cooling performance.

SUMMARY OF THE INVENTION

An object of this invention is to provide an oil feeding device capable of suppressing a reduction of an amount of oil fed to an oil requiring portion, even when a velocity of the moving object changes.

In order to achieve the aforementioned object, according to the present invention, there is provided an oil feeding device which has an oil reserving portion, a first oil requiring portion provided in the moving object and a first oil discharging portion for feeding the oil reserved in the oil reserving portion to the first oil requiring portion, comprising: a regulating member for regulating a relative movement of the oil discharged from the first oil discharging portion and the first oil requiring portion in a moving direction of the moving object; a second oil discharging portion for feeding the oil reserved in the oil reserving portion to the first oil requiring portion; wherein a discharge condition of the oil discharged from the first oil discharging portion is made different from a discharge condition of the oil discharged from the second oil discharging portion in accordance with an amount of the oil in the oil reserving portion. For example, it is possible to change the discharge condition of the oil, specifically, a discharge pressure, by arranging the second oil discharging portion above the first oil discharging portion.

In the present invention, moreover, "the first oil discharging portion for feeding the oil reserved in the oil reserving portion to the first oil requiring portion" includes: "the first oil discharging portion for feeding the oil to the first oil requiring portion by moving the oil reserved in the oil reserving portion in a vertical direction of the moving object"; "the first oil discharging portion for feeding the oil to the first oil requiring portion by moving the oil reserved in the oil reserving portion in a transverse or width direction of the moving object"; and "the first oil discharging portion for feeding the oil to the first oil requiring portion by moving the oil reserved in the oil reserving portion in a longitudinal direction of the moving object".

In the present invention, moreover, "the second oil discharging portion for feeding the oil reserved in the oil reserving portion to the first oil requiring portion" includes: "the second oil discharging portion for feeding the oil to the first oil requiring portion by moving the oil reserved in the oil reserving portion in the vertical direction of the moving object"; "the second oil discharging portion for feeding the oil to the first oil requiring portion by moving the oil reserved in the oil reserving portion in the transverse or the width direction of the moving object"; and "the second oil discharging portion for feeding the oil to the first oil requiring portion by moving the oil reserved in the oil reserving portion in the longitudinal direction of the moving object". Here, the first oil discharging portion and the second oil discharging portion are desired to discharge the oil in the same direction.

According to the present invention, in addition to the above-mentioned construction, it is possible to form a plurality of oil passages divided off by the regulating member and letting therethrough the oil discharged from the first oil discharging portion. A plurality of the oil passages for letting the oil therethrough may be divided off by the regulating member in the longitudinal and transverse directions of the moving object. According to this construction, moreover, "letting the oil therethrough" includes "letting the oil therethrough in a vertical direction".

According to the present invention, in addition to the above-mentioned construction, the second oil discharging portion is arranged above the first oil discharging portion, and there is provided the second oil requiring portion to which the oil discharged from the first oil discharging portion is fed. Moreover, the distance between the oil reserving portion and the second oil requiring portion is set longer than that between the oil reserving portion and the first oil requiring portion. Furthermore, there are formed: a first oil feeding route for feeding the oil discharged from the first oil discharging portion under a low pressure to the first oil requiring portion when the amount of the oil in the oil reserving portion is small; a second oil feeding route for feeding the oil discharged from the first oil discharging portion under a high pressure to the second oil requiring portion when the amount of the oil in the oil reserving portion is large; and a third oil feeding route for feeding the oil discharged from the second oil discharging portion under a low pressure to the first oil requiring portion when the amount of the oil in the oil reserving portion is large.

In the present invention, "the second oil requiring portion to which the oil discharged from the first oil discharging portion is fed" includes: "the second oil requiring portion to which the oil discharged from the first oil discharging portion in the longitudinal direction of the moving object is fed"; and "the second oil requiring portion to which the oil discharged from the first oil discharging portion in the transverse direction (or in the width direction) of the moving object is fed". According to this construction, moreover, "distance" includes "a distance in the transverse direction (or in the width direction) of the moving object", and "a distance in the longitudinal direction of the moving object". According to this construction, still moreover, "a third oil feeding route for feeding the oil to the first oil requiring portion" includes "the third oil feeding route for feeding the oil to the first oil requiring portion by moving the oil in the vertical direction of the moving object".

In addition to any of the above-mentioned construction, according to the present invention, the moving object comprises a prime mover, a first motor generator, a second motor generator, wheels, a power distribution device for distributing the power of the prime mover to the first motor generator and the wheels, and a transmission mechanism arranged on a power transmission route from the second motor generator to the wheel. The first oil requiring portion includes the transmission mechanism, and the second oil requiring portion includes the second motor generator.

In this construction, an axis, which is the center of rotation of the prime mover, the first motor generator, the second motor generator, the power distribution device and the transmission mechanism, may be arranged in the transverse direction (or in the width direction) of the moving object, and the axis, which is the center of rotation of the prime mover, the first motor generator, the second motor generator, the power distribution device and the transmission mechanism, may be arranged in the longitudinal direction of the moving object.

In the present invention, "a moving direction of the moving object" is exemplified by the transverse direction (or the width direction) of the moving object, and the longitudinal direction of the moving object. In each construction of the invention, the "oil requiring portion" includes "a portion itself which is lubricated and cooled by the oil", and "the oil passage" for feeding the oil to the "portion itself".

According to the present invention, when an inertia force is generated in the moving direction of the moving object as a result of the acceleration or deceleration, the oil discharged from the first oil discharging portion contacts with the regulating member. The oil discharged from the first oil discharging portion contacts with the regulating member, also in case the moving object leans in the moving direction on an upslope or a downslope. Therefore, it is possible to suppress the increase in a relative travel distance between the oil discharged from the first oil discharging portion and the oil requiring portion, and to suppress the reduction of the amount of oil at the first oil requiring portion.

Moreover, when the amount of oil in the oil reserving portion varies, i.e., increases or decreases, the discharge conditions of the first oil discharging portion and the second oil discharging portion vary. Therefore, the oil discharged from any one of oil discharging portions is fed to the first oil requiring portion regardless of the amount of oil at the oil reserving portion.

In addition to the above-mentioned effects, according to the present invention, the oil discharged from the first oil discharging portion is fed though a plurality of oil passages to the first oil requiring portion. Accordingly, even if the amount of oil fed though any one of the oil passages to the first oil requiring portion decreases, the oil is fed to the first oil requiring portion through other oil passages. Therefore, the reduction in the amount of oil at the first oil requiring portion can be suppressed more certainly.

In addition to the above-mentioned effects, according to the present invention, when the amount of oil in the oil reserving portion is small, the oil discharged from the first oil discharging portion under a low pressure is fed to the first oil requiring portion through the first oil feeding route, without discharging the oil from the second oil discharging portion.

On the other hand, when the amount of oil in the oil reserving portion is large, the oil discharged from the first oil discharging portion under a high pressure is fed to the second oil requiring portion through the first oil feeding route, and the oil discharged from the second oil discharging portion under a low pressure is fed to the first oil requiring portion through the third oil feeding route.

In addition to the above-mentioned effects, according to the present invention, the power of the prime mover is distributed through the power distribution device to the first motor generator and the wheels. Also, the power of the second motor generator is transmitted to the wheels through the transmission mechanism. Moreover, the oil reserved in the oil reserving portion is fed to the transmission mechanism so that the transmission mechanism is cooled and lubricated, and the oil reserved in the oil reserving portion is fed to the second motor generator so that the second motor generator is cooled.

The above and further objects and novel features of the invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Next, a specific embodiment of this invention will be described hereinafter. The moving object to which the invention is applied is, e.g., a vehicle in which a prime mover is provided and a power of the prime mover is transmitted through a power transmission system to wheels. A gear transmission device or a belt transmission device is used for the power transmission system (i.e., a transmission device). Specifically, those transmission devices comprise such elements as gears meshing with each other, a belt and a pulley, a bearing for holding a rotary member or the like, and a sliding movement, a heat generation and an abrasion occur in those elements. Therefore, the aforementioned elements, i.e., the oil requiring portions are lubricated and cooled by oil fed from the oil feeding device. Hereinafter, an embodiment of the case in which the oil feeding device is employed as the device for lubricating and cooling the power transmission system of a vehicle will be described.

Figure 2:
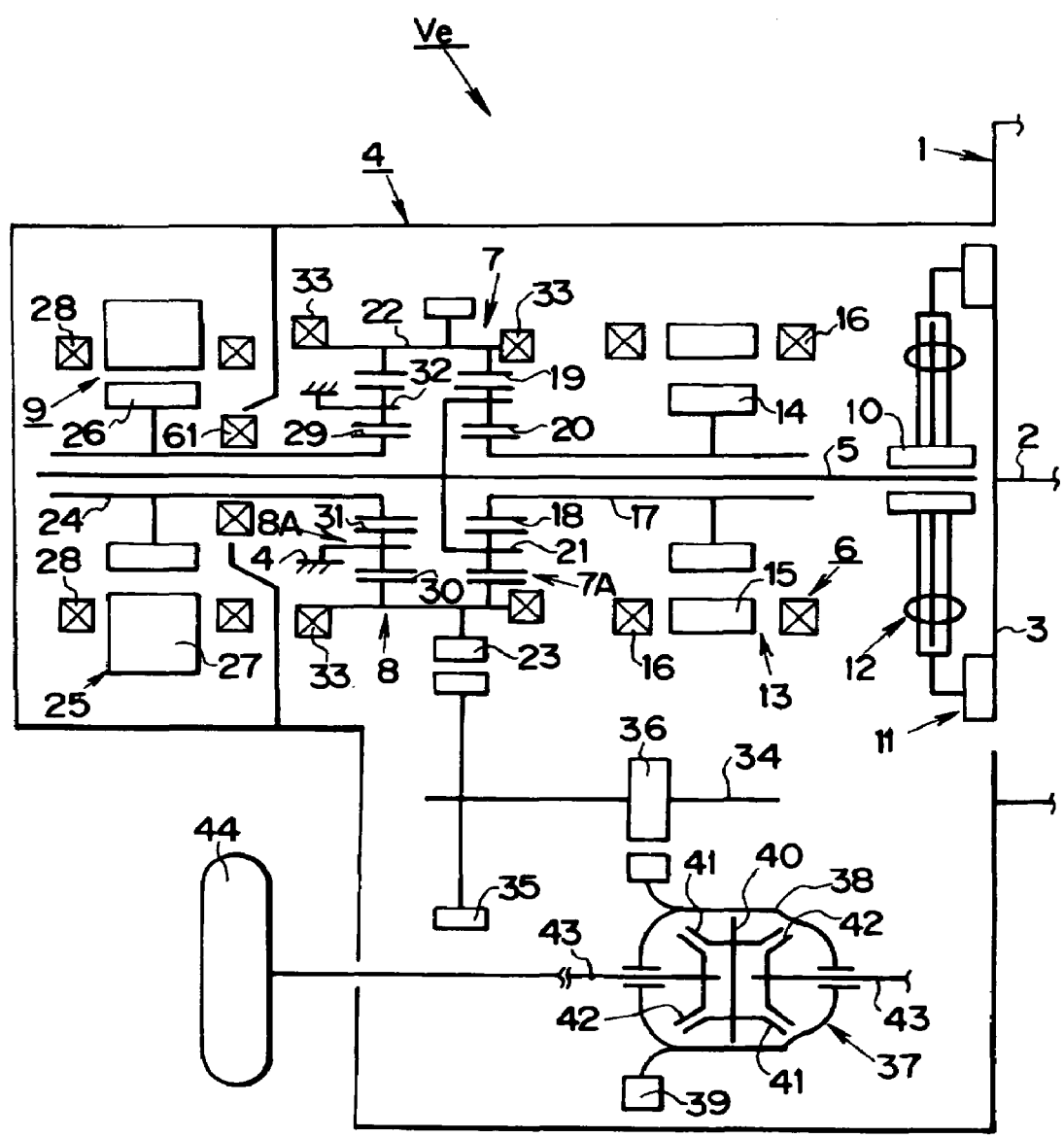
FIG. 2 is a skeleton diagram showing a power train of a hybrid vehicle having the oil feeding device shown in FIG. 1.

FIG. 2 is a skeleton diagram showing a power train of an FF (Front-engine/Front-drive) type hybrid vehicle Ve according to one embodiment of the invention. In FIG. 2, reference numeral 1 designates an engine, which can be exemplified by an internal combustion engine such as a gasoline engine, a diesel engine, an LPG engine, a methanol engine or a hydrogen engine.

This embodiment will be conveniently described on the case in which the gasoline engine is used as the engine 1. This engine 1 outputs a drive power from a crankshaft 2 when the fuel is burned, and is of the well-known type which is equipped with an intake device, an exhaust device, a fuel injection device, an ignition device and a cooling device. The crankshaft 2 is arranged horizontally in the transverse direction of the hybrid vehicle Ve, and equipped with a flywheel 3 at its rear end portion.

To an outer wall of this engine 1, a hollow transaxle case 4 is attached. In the transaxle case 4, there are provided an input shaft 5, a first motor generator 6, a power distribution mechanism 7, a transmission mechanism 8 and a second motor generator 9. The input shaft 5 and the crankshaft 2 are arranged on the common axis. To the end portion of the input shaft 5 on the side of the crankshaft 2, there is splined a clutch hub 10.

A torque limiter 11 is provided on a power transmission route between the flywheel 3 and the input shaft 5. There is also provided a damper mechanism 12 for suppressing/absorbing the torque fluctuation between the flywheel 3 and the input shaft 5. The first motor generator 6 is arranged outside of the input shaft 5, and the second motor generator 9 is arranged at a position farther from the engine 1 than the first motor generator 6.

Specifically, the first motor generator 6 is arranged between the engine 1 and the second motor generator 9. The first motor generator 6 and the second motor generator 9 are provided with: a function (or a power function) acting as an electric motor to be activated when an electric power is fed thereto; and a function (or a regenerative function) acting as a power generator to convert a mechanical energy into an electric energy. The first motor generator 6 and the second motor generator 9 are capable of being driven in both forward and backward directions. A power feeding unit for feeding an electric power to the first motor generator 6 and the second motor generator 9 can be exemplified by a capacitance unit such as a battery or a capacitor, or a well-known fuel cell.

The first motor generator 6 is equipped with a stator 13 fixed on the transaxle case 4 side, and a rotatable rotor 14 having a permanent magnet. The stator 13 is equipped with an iron core 15 and a coil 16 wound on the iron core 15. Around this input shaft 5, on the other hand, there is fitted a hollow shaft 17. The input shaft 5 and the hollow shaft 17 are made so that they can rotate relatively to each other. The rotor 14 is connected to the outer circumference of the hollow shaft 17.

Moreover, the power distribution mechanism 7 is arranged between the first motor generator 6 and the second motor generator 9. This power distribution mechanism 7 is provided with the so-called single pinion type planetary gear mechanism 7A. Specifically, this planetary gear mechanism 7A is equipped with a sun gear 18, a ring gear 19 arranged concentrically with the sun gear 18, and a carrier 21 holding a pinion gear 20 meshing with the sun gear 18 and the ring gear 19.

The rotary elements of the power distributing mechanism 7 thus constructed, i.e., the sun gear 18, the ring gear 19 and the carrier 21 have a differential function. Moreover, the sun gear 18 and the hollow shaft 17 are connected each other, and the carrier 21 and the input shaft 5 are connected each other. Here, the ring gear 19 is formed on the inner circumference side of an annular member (or a cylindrical member) 22 arranged concentrically with the input shaft 5, and a counter drive gear 23 is formed on the outer circumference side of the annular member 22.

On the outer circumference of the input shaft 5, on the other hand, there is mounted a hollow shaft 24 rotatably, and the second motor generator 9 is arranged on the outer circumference side of the hollow shaft 24. The second motor generator 9 is equipped with a stator 25 fixed on the transaxle case 4, and a rotatable rotor 26 having the permanent magnet. The stator 25 is equipped with an iron core 27, and a coil 28 wound on the iron core 27. Here, the rotor 26 is connected rotatably to the hollow shaft 24. Thus, the first motor generator 6, the power distribution mechanism 7 and the second motor generator 9 are arranged on the common axis.

The transmission mechanism 8 is arranged in the axial direction of the input shaft 5 between the power distribution mechanism 7 and the second motor generator 9, and is provided with the so-called "single pinion type planetary gear mechanism 8A". Specifically, this planetary gear mechanism 8A is equipped with a sun gear 29, a ring gear 30 arranged concentrically with the sun gear 29 and formed on the inner circumference portion of the annular member 22, and a carrier 32 holding a pinion gear 31 meshing with the sun gear 29 and the ring gear 30. This carrier 32 is fixed on the transaxle case 4 side. Moreover, there are provided two bearings 33 for holding the annular member 22 rotatably.

In the transaxle case 4, on the other hand, there is disposed a counter shaft 34 in parallel with the input shaft 5. On this counter shaft 34, there are provided a counter driven gear 35 and a final drive pinion gear 36. Moreover, the counter drive gear 23 and the counter driven gear 35 are made to mesh with each other. In the transaxle case 4, moreover, there is disposed a differential gear 37. This differential gear 37 is equipped with a ring gear 39 formed on the outer circumference side of a differential case 38, a plurality of pinion gears 41 connected to the differential case 38 through a pinion shaft 40, side gears 42 meshing with a plurality of the pinion gears 41, and two front drive shafts 43 connected to the side gears 42. Front wheels (or wheels) 44 are connected to the individual front drive shafts 43. Thus in the transaxle case 4, there is constructed the so-called "transaxle", in which the speed change mechanism 8 and the differential gear 37 are assembled together.

Although not shown, there is provided an electronic control unit for controlling the entire vehicle. This electronic control unit is constructed of a microcomputer which is mainly composed of a processing unit (e.g., CPU or MPU), memory units (e.g., RAM and ROM) and an input/output interface. To this electronic control unit, there are inputted the signal of an ignition switch, the signal of an engine speed sensor, the signal of a brake switch, the signal of a vehicle speed sensor, the signal of an accelerator opening sensor, the signal of a shift position sensor, the signals of resolvers for detecting the rotation frequency of the first motor generator 6 and the second motor generator 9, and so on. As the shift positions detected by the shift position sensor, there are Parking position, Reverse position, Neutral position, and Drive position and so on. From the electronic control unit, on the other hand, there are outputted the signals for controlling the intake air, the fuel injection rate and the ignition timing of the engine 1, the signals for controlling the outputs of the first motor generator 6 and the second motor generator 9, and so on.

In the hybrid vehicle Ve thus constructed as mentioned above, the output of the engine 1, and the outputs of the first motor generator 6 and the second motor generator 9 are controlled on the basis of the signal inputted into the electronic control unit, and data stored in the electronic control unit. In case the starting condition of the engine 1 is satisfied, for example, the first motor generator 6 is operated as an electric motor and the engine 1 is cranked (or motored) by a torque of the first motor generator 6, whereas feeding and burning a fuel. When the engine speed reaches a number of revolutions such that the engine 1 is allowed to rotate autonomously, the cranking (or the motoring) by the first motor generator 6 is ended.

Various modes, such as an engine running mode, a hybrid mode, or an electric vehicle mode can be selectively switched on the basis of the conditions, such as an acceleration demand judged from an accelerator opening, a shift position, or the like. In case the acceleration demand is greater than a predetermined value and the engine running mode is selected, the engine 1 is controlled to a running state, and the torque outputted by the engine 1 is transmitted to the carrier 21 of the power distribution mechanism 7 through the input shaft 5. Here, the first motor generator 6 is controlled to act as a reaction element, and the engine torque is transmitted to the ring gear 19.

Specifically, the first motor generator 6 is operated as the motor generator to generate a regenerative torque, and a reaction torque in accordance with the engine torque is secured. By means of controlling the speed of the first motor generator 6, a ratio between the speeds of the carrier 21 and the engine 1, and the speed of the ring gear 19, namely, a gear ratio can be controlled steplessly by the differential action of the rotary elements forming the power distribution mechanism 7. In short, the power distribution mechanism 7 has a function as a continuously variable transmission. By thus operating the power distribution mechanism 7 as the continuously variable transmission, the running state of the engine 1 can be approximated to the running state in line with an optimum fuel economy curve of an engine control map. In the engine control map, an engine speed and an engine torque are set as parameters.

The engine torque transmitted to the ring gear 19 is thus transmitted to the front wheel 44 through the counter drive gear 23, the counter driven gear 35, the counter shaft 34, the final drive pinion gear 36 and the deferential gear 37, and as a result, the driving force is generated. As mentioned above, the power distribution mechanism 7 has the function to mechanically distribute the power outputted by the engine 1 to the first motor generator 6 and to the front wheel 44. In this point of view, the hybrid vehicle Ve can be categorized as a mechanical distribution type hybrid vehicle. Here, the power is not outputted from the second motor generator 9 in case the engine running mode is selected.

In case the hybrid mode is selected, on the other hand, the engine 1 is driven and the second motor generator 9 functions as the motor generator. If the power of the second motor generator 9 is transmitted to the sun gear 29 of the transmission mechanism 8 through the hollow shaft 24, the carrier 32 acts as the reaction element, so that the rotational speed of the sun gear 29 is reduced and the power is transmitted in the direction to rotate the ring gear 30 opposite to the rotational direction of the sun gear 29. In other words, in case the hybrid mode is selected, the powers of the engine 1 and the second motor generator 9 are synthesized by the power distribution mechanism 7 and transmitted to the wheel 44.

In case the electric vehicle mode is selected, moreover, the power of the second motor generator 9 is transmitted to the wheel 44 as mentioned above, and feeding of the fuel to the engine 1 is cut off. Here, in case the acceleration demand is decreased and the hybrid vehicle Ve runs on inertia, the power corresponding to the kinetic energy of the hybrid vehicle Ve is transmitted from the wheel 44 to the first motor generator 6 and the second motor generator 9. Therefore, it is possible to charge an accumulator with the electric power generated by operating at least one of the first motor generator 6 and the second motor generator 9 electric generator.

Figure 1:
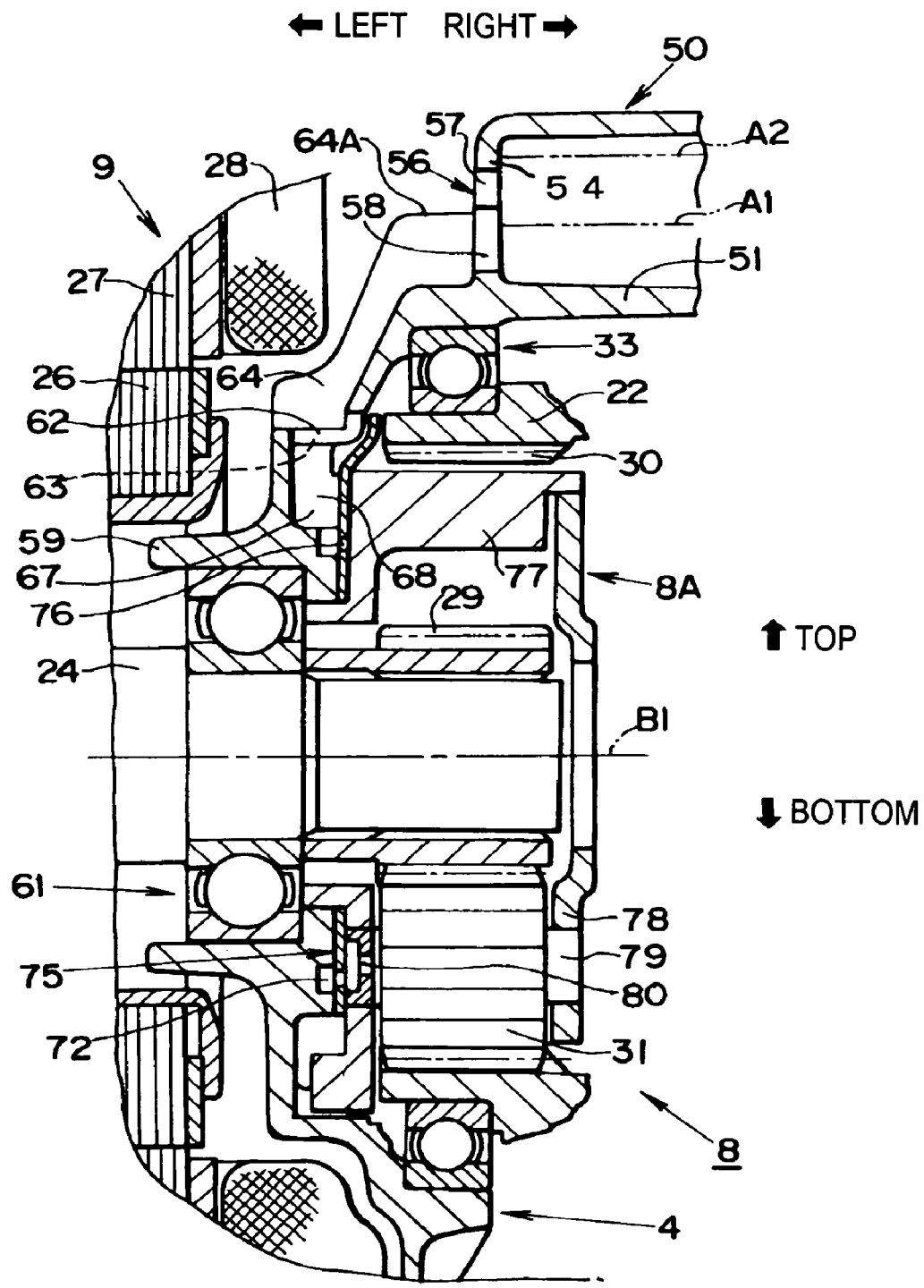
FIG. 1 is a front cross-sectional view showing a transmission mechanism having an oil feeding device of the invention and its vicinity.

Next, a construction of the oil feeding device for feeding the oil to the transmission mechanism 8 and the second motor generator 9 will be described with reference to FIGS. 1, 3 and 4. FIG. 1 is a front cross-sectional view in the vertical direction (i.e., heightwise) of the hybrid vehicle Ve, which illustrates the transmission mechanism 8 and peripheral portion thereof. More specifically, FIG. 1 is the front cross-sectional view showing a plane including a center axis B1 of the hollow shaft 24. The center axis B1 is directed in a transverse (or a width) direction of the hybrid vehicle Ve. To explain the position of the hybrid vehicle Ve in FIG. 1, the top and bottom of FIG. 1 respectively correspond to the upside and downside of the hybrid vehicle Ve. Also, the right side of FIG. 1 corresponds to the right side of the hybrid vehicle Ve, and the left side corresponds to the left side of the hybrid vehicle Ve.

Figure 3:
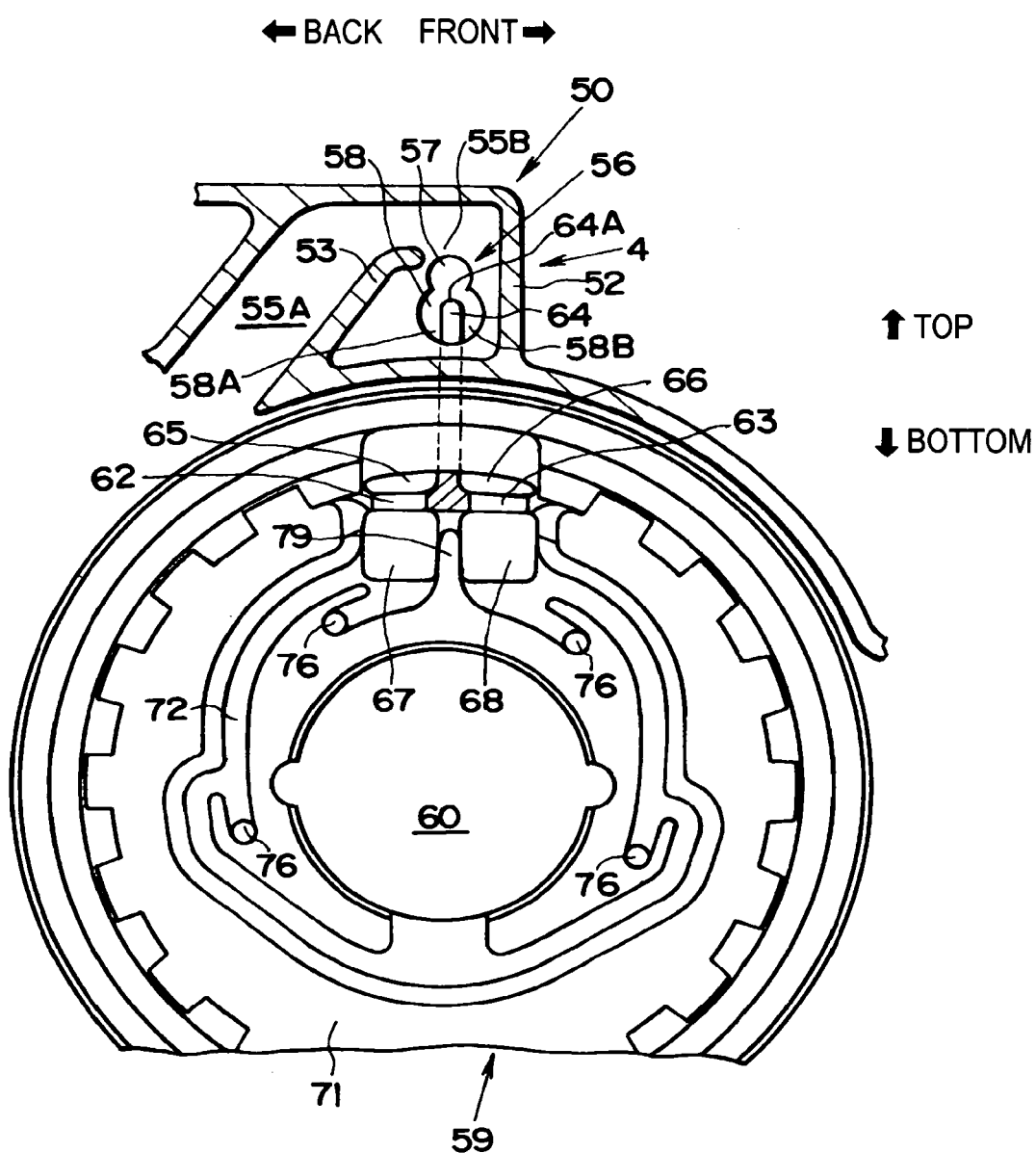
FIG. 3 is a sectional side view showing the oil feeding device shown in FIG. 1.
Figure 4:
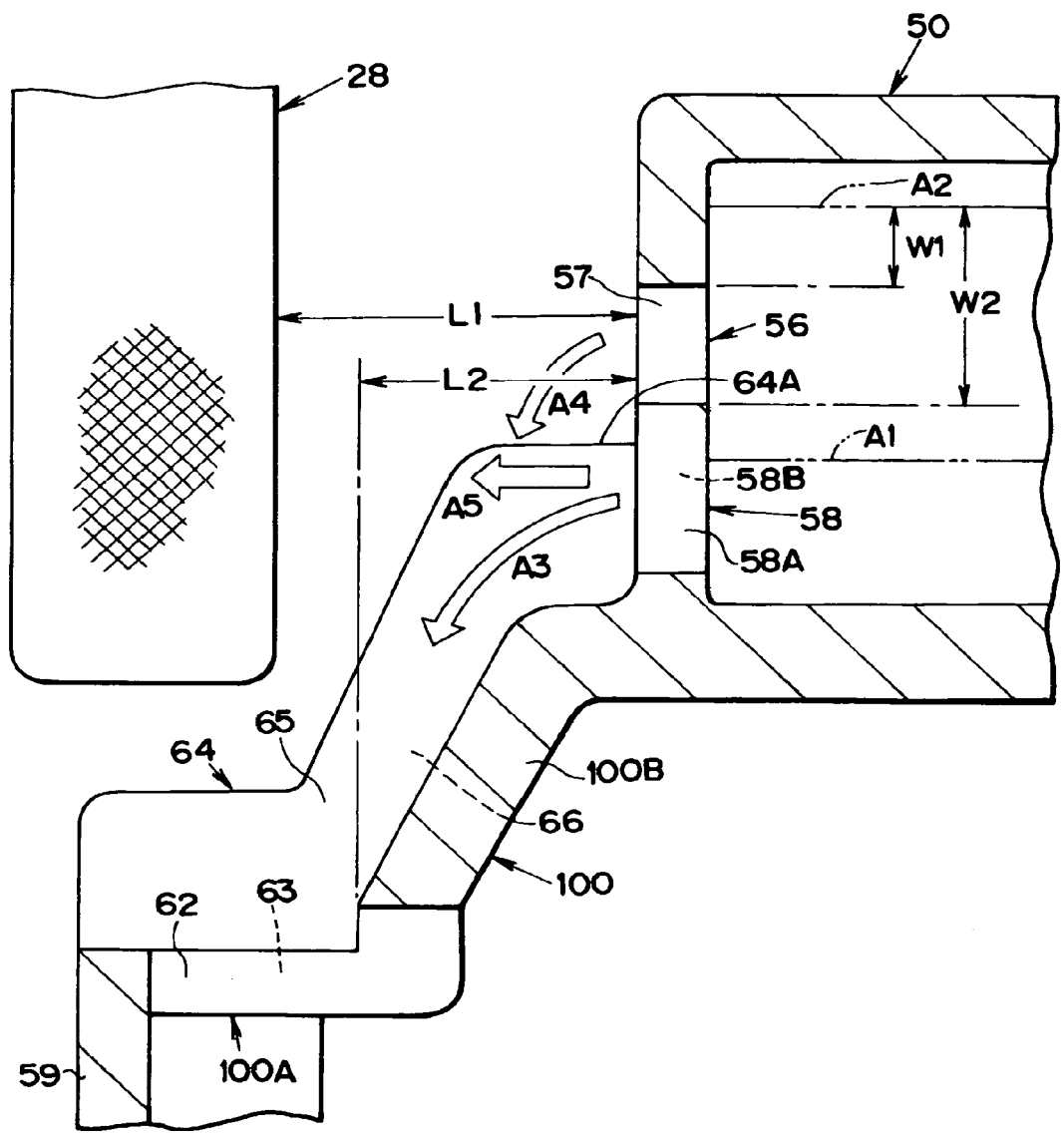
FIG. 4 is an enlarged partial sectional view showing the oil feeding device shown in FIG. 1.

Moreover, FIG. 3 is a sectional side view showing a plane perpendicular to the center axis B1 of FIG. 1, and FIG. 4 is an enlarged partial sectional view of FIG. 1. To explain the position of the hybrid vehicle Ve in FIG. 3, the top and bottom of FIG. 3 respectively correspond to the upside and downside of the hybrid vehicle Ve. Also, the right side of FIG. 3 corresponds to the front side of the hybrid vehicle Ve, and the left side of FIG. 3 corresponds to the rear side of the hybrid vehicle Ve.

As can be seen in FIGS. 1, 3 and 4, moreover, a catch tank 50 is provided inside of the transaxle case 4, above the transmission mechanism 8. This catch tank 50 is formed so that it leads to the transaxle case 4. The catch tank 50 and a coil 28 of the second motor generator 9 are arranged side by side in the transverse (i.e., a width) direction of the hybrid vehicle Ve at generally same heights. This catch tank 50 comprises a bottom plate 51, and side plates 52, 53 and 54. Additionally, there is formed an opening portion 55B in the upside of the catch tank 50.

On the other hand, the side plate 54 extends in the direction perpendicular to the center axis B1. An oil hole 56 is formed to penetrate the side plate 54 in its thickness direction, i.e., in the direction parallel with the center axis B1. The oil hole 56 comprises an upper passage 57 and a lower passage 58, and the upper passage 57 communicates at its lower portion with the lower passage 58. The upper passage 57 and the lower passage 58 is a circular hole portion, respectively, and the diameter of lower passage 58 is larger than that of the upper passage 57.

In the transaxle case 4, an oil conducting member 59 is provided around the hollow shaft 24. Here, the oil conducting member 59 is so arranged not to rotate. The construction of oil conducting member 59 is made such that, for example, the oil conducting member 59 and the transaxle case 4 are formed integrally with each other. Alternatively, the oil conducting member 59 and the transaxle case 4 are prepared separately, and then fixed to each other by a fastener (not shown) such as a screw member. The former construction is explained in this embodiment. The oil conducting member 59 is made into an annular shape, and a through hole 60 is formed therein. The hollow shaft 24 is inserted into the through hole 60, and held rotatably by a bearing 61 mounted on the oil conducting member 59.

There is formed a connecting portion 100 for connecting the catch tank 50 and the oil conducting member 59. As shown in FIG. 4, the connecting portion 100 has a flat portion 100A close to the oil conducting member 59 and generally parallel with the center axis B1, and an inclined portion 100B extending obliquely from an end portion of the flat portion 100A to the catch tank 50. The inclined portion 100B is connected to the catch tank 50, whereas the flat portion 100A is connected to the oil conducting member 59. Also, oil passages 62 and 63 are formed to penetrate the flat portion 100A in a thickness direction or a vertical direction. These oil passages 62 and 63 are arranged lower than the coil 28. Moreover, a partition member 64 is provided on the upper face of the connecting portion 100.

As illustrated in FIGS. 1, 3 and 4, the partition member 64 is a plate-like portion formed to have a generally constant height on the upper face of said connecting portion 100 almost perpendicularly, in other words, upwardly in the vertical direction. Therefore, an upper edge of the partition member 64 has a curvature almost similarly to the upper face of the connecting portion 100. Moreover, one of the end portions of the partition member 64 leads to almost center of an opening end of the lower passage 58. Therefore, the opening end of the lower passage 58 is divided into a right part and a left part. On the other hand, the other end portion of the partition member 64 almost leads to an end portion of the flat portion 100A at the oil conducting member 59 side. Therefore, the other end portion of the partition member 64 is positioned at an inner circumferential side (i.e., a lower side of FIGS. 1 and 4) of the coil 28.

As illustrated in FIG. 3, the partition member 64 is formed generally vertical in the plane perpendicular to the axis, accordingly, the oil passages 62 and 63 formed in the flat portion 100A are divided by the partition member 64 in the longitudinal direction of the vehicle. Also, a plurality of oil passages 65 and 66 divided off by the partition member 64 are formed on the upper side of the connecting portion 100. Moreover, the lower passage 58 is divided into two lower passages 58A and 58B by the partition member 64. One of the lower passages 58A is communicated with the oil passage 65, and the other lower passage 58B is communicated with the oil passage 66.

In the longitudinal direction of the hybrid vehicle Ve, the oil passage 66 is positioned in the front side, and the oil passage 65 is positioned in the rear side. The oil passages 65 and 62 are communicated with each other, whereas the oil passages 63 and 66 are communicated with each other. Moreover, according to the embodiment shown in FIG. 4, in the axial direction (i.e., horizontal direction), a distance L1 from the opening end of the oil hole 56 to the coil 28 is set longer than a distance L2 from the opening end of the oil hole 56 to the oil passages 62 and 63. Besides, the distances L1 and L2 may be the same, otherwise, the distance L2 may be longer than the distance L1.

One of the bearings 33 is installed in an inner circumferential face side of the connecting portion 100. Moreover, an oil passage 67 communicating with the oil passage 62 and an oil passage 68 communicating with the oil passage 63 are formed in the oil conducting member 59. Those oil passages 67 and 68 are arranged at the lower portion than the oil hole 56. Also, those oil passages 67 and 68 are formed as recessions in the oil conducting member 59 in a radial direction. Moreover, the oil passages 67 and 68 are divided off by a partition member 70. An end face 71 is formed in the oil conducting member 59, on which an oil passage (or a slit portion) 72 communicating with the oil passages 67 and 68 is formed. The oil passage 72 is formed into annular shape so as to surround a shaft hole 60.

On the other hand, a carrier 32, which is attached unrotatively to the transaxle case 4, comprises an annular holder 77, an annular plate 78 and a plurality of pinion shafts 79 for connecting the holder 77 with the plate 78. Also, between the holder 77 and the oil conducting member 59 an oil receiver 75 is provided. The oil receiver 75 is a plate member made into an annular shape, on which a plurality of oil passages 76 are formed at predetermined interval in a circumferential direction. The oil passage 76 is so formed as to penetrate the oil receiver 75 in the axial direction, and is communicated with a plurality of oil passages 72. Furthermore, an oil passage 80 formed in the pinion shaft 79 is communicated with the oil passages 76.

In the hybrid vehicle Ve shown in FIG. 2, a meshing portion between the gears forming a planetary gear mechanism 8A of the transmission mechanism 8 generates heat and gets worn, while the coil 28 of the motor generator 9 generates heat due to an electrical resistance. In this connection, here will be described an action to lubricate and cool the planetary gear mechanism 8A to cool the coil 28. First of all, the oil collecting on the bottom portion of the transaxle case 4 is scraped up by a rotation of the ring gear 39 of the differential gear 37 etc., and then, the scraped oil is partially fed to the catch tank 50 through an oil feeding passage 55A and an opening portion 55B. The oil fed to the catch tank 50 is discharged outside thereof from the oil hole 56 in the horizontal direction of the hybrid vehicle Ve, and then the oil is fed to the planetary gear mechanism 8A of the transmission mechanism 8 and the coil 28 of the second motor generator 9.

Hereinafter, a process of feeding the oil in the catch tank 50 to the planetary gear mechanism 8A and the coil 28 will be described. When the hybrid vehicle Ve runs at a low speed, the amount of the oil fed to the catch tank 50 is small because the rotation speed of the ring gear 39 or the like scraping up the oil is low. The amount of the oil in this case is indicated by, e.g., a liquid level A1. This liquid level A1 is below an upper end 64A of the partition member 64. In this case, the oil in the catch tank 50 is discharged downwardly from the lower passage 58, and then passes a route A1 indicated by an arrow. In other words, the oil moves (drops or flows) downwardly through the oil passages 65 and 66, and then reaches the oil passages 62 and 63.

Thus, a part of the oil discharged from the catch tank 50 is fed to the oil passage 72 through one route, i.e., the oil passages 65, 62 and 67. On the other hand, a part of the oil discharged from the catch tank 50 is fed to the oil passage 72 through the other route, i.e., the oil passages 66, 63 and 68. The oil fed to the oil passage 72 is fed through the oil passage 80 to the meshing portion between the gears constituting the planetary gear mechanism 8A. In case the liquid level A1 is below the upper end 64A of the partition member 64, the oil is never discharged from the upper passage 57.

On the other hand, when the hybrid vehicle Ve runs at a medium or high speed, the rotation speed of the ring gear 39 of the differential gear 37 becomes higher than that of the case in which the hybrid vehicle Ve runs at a low speed. Accordingly, when the hybrid vehicle Ve runs at a medium or high speed, the amount of the oil in the catch tank 50 increases in comparison with the case in which the hybrid vehicle Ve runs at a low speed. The oil amount of the case in which the hybrid vehicle Ve runs at a medium or high speed (i.e., a filled state) is indicated by, e.g., a liquid level A2.

This liquid level A2 is positioned above the upper end 64A of the partition member 64. In this case, a depth W2 from the liquid level A2 to the lower passage 58 is further deepened. That is, when the hybrid vehicle Ve runs at a medium or high speed, the oil is discharged from the lower passage 58 by an oil pressure P2 in the horizontal direction of the hybrid vehicle Ve. Moreover, the oil is also discharged from the upper passage 57 by an oil pressure P1 in the horizontal direction of the hybrid vehicle Ve. Since a depth W1 from the liquid level A2 to the upper passage 57 is shallower than the depth W2, the oil pressure (or a discharging pressure) P1 is lower than the oil pressure (or a discharging pressure) P2. That is, as shown in FIG. 4, the oil from the upper passage 57 is discharged obliquely downward and passes through a route A4, then fed to the oil passage 72 through the oil passages 65 and 66.

On the other hand, the oil from the lower passage 58 is discharged in generally as horizontal direction as a route A5, and then put on the coil 28. Consequently, a temperature rise in the coil 28 due to the electrical resistance is suppressed. The oil fed to the coil 28 and the planetary gear mechanism 8A is led to the bottom portion of the transaxle case 4 through the oil passage (not shown), and then scraped up by the ring gear 39 to circulate in the distribution route for the oil.

Here will be described the case in which the hybrid vehicle Ve runs at a medium or high speed, and in which the hybrid vehicle Ve climbs a slope. In this case, the depth from the liquid level A2 of the oil to one lower passage 58A (i.e., the lower passage 58A positioned downward in the vehicle which is inclined on the slope) is deeper than the depth from the liquid level A2 of the oil to the other lower passage 58B (i.e., the lower passage 58B positioned upward in the vehicle which is inclined on the slope). Consequently, the oil pressure P3 of the oil discharged from the lower passage 58A is higher than the oil pressure P4 of the oil discharged from the lower passage 58B. Here, the oil pressure P2 of the oil discharged from the upper passage 57 is lower than the oil pressure P3.

Moreover, if the hybrid vehicle Ve decelerates when it is running at a medium or high speed, the oil plunges toward the lower passage 58B, which is positioned at a front side of the vehicle, in the catch tank 50. As a result of this, the oil pressure P4 is higher than the oil pressure P3, and the oil pressure P2 is lower than the oil pressure P3. Since the lower passage 58A and the lower passage 58B are thus divided off by the partition member 64, in any case that the hybrid vehicle Ve climbs the slope and that the hybrid vehicle Ve decelerates, the oil is discharged downwardly from the upper passage 57 and the lower passages 58A and 58B, and the oil discharged from the lower passage 58B is then fed to the planetary gear mechanism 8A through the oil passages 66 and 72. On the other hand, the oil discharged from the lower passage 58A in generally horizontal direction is fed to the coil 28 through the route A5.

Here will be described, moreover, the case in which the hybrid vehicle Ve runs at a steady speed, i.e., at a medium or high speed, and in which the hybrid vehicle Ve runs down the slope. In this case, the depth from the liquid level A2 to one lower passage 58B positioned at the front side of the vehicle is deeper than the depth from the liquid level A2 to the other lower passage 58A positioned at the rear side of the vehicle. Consequently, the oil pressure P4 of the oil discharged from the lower passage 58B is higher than the oil pressure P3 of the oil discharged from the lower passage 58A. Here, the oil pressure P2 of the oil discharged from the upper passage 57 is lower than the oil pressure P4. Moreover, if the hybrid vehicle Ve accelerates when it runs at a medium or high speed, the oil plunges toward the lower passage 58B, which is positioned at a rear side of the vehicle, in the catch tank 50. As a result of this, the oil pressure P4 is higher than the oil pressure P3, and the oil pressure P2 is lower than the oil pressure P4.

Since the lower passage 58A and the lower passage 58B are thus divided off by partition member 64, in any of the case that the hybrid vehicle Ve runs down the slope and that the hybrid vehicle Ve accelerates, the oil is discharged downwardly from the upper passage 57 and the lower passages 58A and 58B. The oil discharged from the lower passage 58A is fed to the planetary gear mechanism 8A through the oil passages 65 and 72, whereas the oil discharged from the lower passage 58B in generally horizontal direction is fed to the coil 28 through the route A5.

Thus, it is possible to divide and feed the oil discharged from the catch tank 50 to the planetary gear mechanism 8A and to the coil 28, even though the amount of the oil fed to the catch tank 50 varies. Accordingly, even in when the running condition of the hybrid vehicle Ve changes, a shortage of the feeding amount of the oil is solved to suppress the deterioration in the lubricating performance and the cooling performance. Moreover, in case a disturbance acts on the hybrid vehicle Ve, specifically, in case the hybrid vehicle Ve accelerates or decelerates, or in case the hybrid vehicle Ve climbs or runs down the slope, the oil passing through one of the oil passages 65 and 66 contacts with the partition member 64 thereby to suppress a relative movement between the oil and the oil passage 62 or 63 in the longitudinal direction of the vehicle Ve. This makes it much easier to avoid an insufficient feeding of the oil. In the above description, the oil pressure of the oil (i.e., the discharging pressure) is used as a criterion. Here, it is obvious from Trricelli's theorem that flow velocities of the oil discharged through the individual passages are different if the heights from the liquid level to the upper and lower passages are different. That is, the higher the height from the liquid level to the oil discharging hole is, the greater the kinetic energy of the oil discharged from the catch tank 50.

Here will be described the corresponding relations between the constructions of the embodiment and this invention. The hybrid vehicle Ve corresponds to the moving object of the invention; the catch tank 50 corresponds to the oil reserving portion of the invention; the oil passages 62, 63, 72 and 76, and the transmission mechanism 8 correspond to the first oil requiring portion of the invention; the lower passage 58 corresponds to the first oil discharging portion of the invention; the partition member 64 corresponds to the regulating member of the invention; the upper passage 57 corresponds to the second oil discharging portion of the invention; the oil pressure and the flow velocity of the oil, the direction of oil discharging and so on correspond to the "oil discharging condition" of the invention; and the coil 28 corresponds to the second oil requiring portion of the invention. Also, the route A3 corresponds to the first oil feeding route of the invention; the route A5 corresponds to the second oil feeding route of the invention; the route A4 corresponds to the third oil feeding route of the invention; and the engine 1 corresponds to the prime mover of the invention.

In FIGS. 1, 3 and 4, the upper passage 57 and the lower passage 58 are communicating with each other, in other words, formed into a unified oil hole 56. However, it is also possible to form a plurality of oil discharging portions to be arranged at different heights. Specifically, it is sufficient that the oil discharging portions are in such a positional relation that the discharging direction of the oil is adjusted by utilizing the pressure difference. It is also possible to vary the discharging condition of the oil at individual oil discharging portion by changing shapes and diameters of the openings of a plurality of the oil discharging portions. Moreover, individual oil requiring portion includes a bearing, a belt-type continuously variable transmission, a frictional engagement device (i.e., a clutch and a brake), a gear transmission and so on, in addition to the aforementioned stuffs. Furthermore, the present invention can be applied not only to the vehicle in which an axis to be the center of the rotation of the rotary members constituting the power train is arranged in the transverse direction of the vehicle, but also to a vehicle in which an axis to be the center of the rotation of the rotary members constituting the power train is arranged in the longitudinal direction of the vehicle.

Here will be enumerated the characteristic constructions in the foregoing specific embodiments. Specifically, according to the invention, an oil feeding method for feeding the oil to the first oil requiring portion by discharging the oil retained in the oil reserving portion from the first oil discharging portion is characterized in that the second oil discharging portion is positioned above the first oil discharging portion; a second oil requiring portion is provided to which the oil discharged from the first oil discharging portion is fed; the distance between the oil reserving portion and the second oil requiring portion is set longer than that between the oil reserving portion and the first oil requiring portion; the oil discharged from the first oil discharging portion under a low pressure is fed to the first oil requiring portion when the amount of the oil in the oil reserving portion is small; the oil discharged from the first oil discharging portion under a high pressure is fed to the second oil requiring portion when the amount of the oil in the oil reserving portion is large; and the oil discharged from the second oil discharging portion under a low pressure is fed to the first oil requiring portion when the amount of the oil in the oil reserving portion is large. Here, "the oil feeding device" set forth in claims may be translated into "the oil feeding device for a moving object" or "the oil feeding device for a transmission".

What is claimed is:

1. An oil feeding device, comprising:
   an oil reserving portion that includes a bottom plate and a side plates;
   a first oil requiring portion;
   a first oil discharging portion for discharging oil from an oil hole formed to penetrate one of the side plates of the oil reserving portion and feeding the oil to the first oil requiring portion; and
   a second oil discharging portion for feeding the oil to the first oil requiring portion by discharging the oil from an oil hole formed to penetrate one of the side plates of the oil reserving portion;
   wherein a difference between a discharge condition of the oil discharged from the first oil discharging portion and a discharge condition of the oil discharged from the second oil discharging portion corresponds to an amount of the oil in the oil reserving portion.

2. An oil feeding device according to claim 1, further comprising:
   a planetary gear mechanism holding a pinion gear and having a carrier; and
   wherein the first oil requiring portion is the portion that conducts the oil into the pinion gear.

3. An oil feeding device according to claim 1, further comprising a regulating member that regulates movement of the oil discharged from the first oil discharging portion relative to the first oil requiring portion in a direction substantially parallel to a direction of motion of a moving object that includes the oil feeding device.

4. An oil feeding device according to claim 3, wherein the regulating member divides the oil discharged from the first oil discharging portion into two separate streams of oil.

5. An oil feeding device according to claim 4, further comprising a plurality of oil passages that receive and convey the oil discharged from the first oil discharging portion and divided by the regulating member.

6. An oil feeding device which has an oil reserving portion and a first oil requiring portion provided in a moving object, and a first oil discharging portion for discharging oil from the oil reserving portion and feeding the oil to the first oil requiring portion, comprising:
   a regulating member that regulates movement of the oil discharged from the first oil discharging portion relative to the first oil requiring portion in a moving direction of the moving object;
   a second oil discharging portion for feeding the oil to the first oil requiring portion by discharging the oil from the oil reserving portion;
   a plurality of oil passages that let therethrough the oil discharged from the first oil discharging portion and divided by the regulating member,
   wherein a discharge condition of the oil discharged from the first oil discharging portion is made different from a discharge condition of the oil discharged from the second oil discharging portion in accordance with an amount of the oil in the oil reserving portion.

7. An oil feeding device which has an oil reserving portion and a first oil requiring portion provided in a moving object, and a first oil discharging portion for discharging oil from the oil reserving portion and feeding the oil to the first oil requiring portion, comprising:

a regulating member that regulates movement of the oil discharged from the first oil discharging portion relative to the first oil requiring portion in a moving direction of the moving object;

a second oil discharging portion for feeding the oil to the first oil requiring portion by discharging the oil from the oil reserving portion;

a second oil requiring portion to which the oil discharged from the first oil discharging portion is fed;

a first oil feeding route for feeding the oil discharged from the first oil discharging portion under a low pressure to the first oil requiring portion when the amount of the oil in the oil reserving portion is small;

a second oil feeding route for feeding the oil discharged from the first oil discharging portion under a high pressure to the second oil requiring portion when the amount of the oil in the oil reserving portion is large; and a third oil feeding route for feeding the oil discharged from the second oil discharging portion under a low pressure to the first oil requiring portion when the amount of the oil in the oil reserving portion is large;

wherein the second oil discharging portion is arranged above the first oil discharging portion;

wherein a distance between the oil reserving portion and the second oil requiring portion is set longer than that between the oil reserving portion and the first oil requiring portion; and wherein a discharge condition of the oil discharged from the first oil discharging portion is made different from a discharge condition of the oil discharged from the second oil discharging portion in accordance with an amount of the oil in the oil reserving portion.

8. An oil feeding device which has an oil reserving portion and a first oil requiring portion provided in a moving object, and a first oil discharging portion for discharging oil from the oil reserving portion and feeding the oil to the first oil requiring portion, comprising:

a regulating member that regulates movement of the oil discharged from the first oil discharging portion relative to the first oil requiring portion in a moving direction of the moving object;

a second oil discharging portion for feeding the oil to the first oil requiring portion by discharging the oil from the oil reserving portion;

wherein the moving object comprises: a prime mover; a first motor generator; a second motor generator; wheels; a power distribution device for distributing a power of the prime mover to the first motor generator and the wheels; and a transmission mechanism arranged on a power transmission route from the second motor generator to the wheels;

wherein the first oil requiring portion includes the transmission mechanism;

wherein the second oil requiring portion includes the second motor generator; and wherein a discharge condition of the oil discharged from the first oil discharging portion is made different from a discharge condition of the oil discharged from the second oil discharging portion in accordance with an amount of the oil in the oil reserving portion.

9. An oil feeding device which has an oil reserving portion and a first oil requiring portion provided in a moving object, and a first oil discharging portion for discharging oil from the oil reserving portion and feeding the oil to the first oil requiring portion, comprising:

a regulating member that regulates movement of the oil discharged from the first oil discharging portion relative to the first oil requiring portion in a moving direction of the moving object;

a second oil discharging portion for feeding the oil to the first oil requiring portion by discharging the oil from the oil reserving portion;

an inclined portion for conducting the oil discharged from at least one of the first oil discharging portion and the second oil discharging portion to the first oil requiring portion positioned below the oil discharging portions;

wherein the second oil discharging portion is arranged above the first oil discharging portion;

wherein the regulating member includes a plate-like portion erected on an upper face of the inclined portion so as to divide the first oil discharging portion into a right part and a left part with respect to the direction of discharge of the oil, and so as to divide the upper face of the inclined portion into a right part and a left part with respect to the flow direction of the oil;

wherein oil passages are formed on both sides of the plate-like portion; and wherein a discharge condition of the oil discharged from the first oil discharging portion is made different from a discharge condition of the oil discharged from the second oil discharging portion in accordance with an amount of the oil in the oil reserving portion.

10. An oil feeding device according to claim 9, wherein the second oil requiring portion is located separate from and above the first oil requiring portion, and is arranged to face the first oil discharging portion; and wherein the oil discharged from the first oil discharging portion is squirted to the first oil requiring portion when a depth of the oil is deep in the oil reserving portion.

11. An oil feeding device according to claim 10, wherein the first oil requiring portion includes a portion requiring the oil for lubrication; and wherein the second oil requiring portion includes a portion requiring the oil for cooling.

12. An oil feeding device according to claim 9, wherein said oil discharging portions are each formed so as to discharge the oil perpendicularly with respect to the longitudinal direction of the moving object; and wherein the regulating member extends in the direction to discharge the oil.

13. An oil feeding device which has an oil reserving portion and a first oil requiring portion provided in a moving object, and a first oil discharging portion for discharging oil from the oil reserving portion and feeding the oil to the first oil requiring portion, comprising:

a regulating member that regulates movement of the oil discharged from the first oil discharging portion relative to the first oil requiring portion in a moving direction of the moving object;

a second oil discharging portion for feeding the oil to the first oil requiring portion by discharging the oil from the oil reserving portion;

a case in which gears are accommodated and the oil reserving portion is formed above the gears; and an oil feeding route and an opening portion for conducting the oil scraped up as a result of a rotation of the gears to the oil reserving portion, wherein a discharge condition of the oil discharged from the first oil discharging portion is made different from a discharge condition of the oil discharged from the second oil discharging portion in accordance with an amount of the oil in the oil reserving portion.

* * * * *